United States Patent
Turtinen et al.

(10) Patent No.: US 12,520,375 B2
(45) Date of Patent: Jan. 6, 2026

(54) METHODS AND APPARATUSES FOR CHANNEL STATE INFORMATION REPORTING

(71) Applicant: Nokia Technologies Oy, Espoo (FI)

(72) Inventors: Samuli Turtinen, Ii (FI); Benoist Sebire, Tokyo (JP); Chunli Wu, Beijing (CN); Jussi-Pekka Koskinen, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 321 days.

(21) Appl. No.: 17/999,753

(22) PCT Filed: Jun. 24, 2020

(86) PCT No.: PCT/CN2020/098163
§ 371 (c)(1),
(2) Date: Nov. 23, 2022

(87) PCT Pub. No.: WO2021/258344
PCT Pub. Date: Dec. 30, 2021

(65) Prior Publication Data
US 2023/0217538 A1 Jul. 6, 2023

(51) Int. Cl.
*H04W 76/28* (2018.01)
*H04B 7/06* (2006.01)

(52) U.S. Cl.
CPC .......... *H04W 76/28* (2018.02); *H04B 7/0626* (2013.01)

(58) Field of Classification Search
CPC . H04W 76/28; H04W 92/18; H04W 52/0216; H04W 52/0219; H04W 52/0229;
(Continued)

(56) References Cited

U.S. PATENT DOCUMENTS

| 2015/0282080 A1 | 10/2015 | Maattanen et al. |
| 2016/0255676 A1 | 9/2016 | Vajapeyam et al. |

(Continued)

FOREIGN PATENT DOCUMENTS

| CN | 104871575 A | 8/2015 |
| CN | 110035454 A | 7/2019 |

(Continued)

OTHER PUBLICATIONS

"LS on secondary DRX group", 3GPP TSG-RAN2 Meeting #108, R2-1916597, 3GPP RAN WG2, Nov. 18-22, 2019, 2 pages.
(Continued)

*Primary Examiner* — Peter Chen
(74) *Attorney, Agent, or Firm* — Carter, DeLuca & Farrell LLP

(57) ABSTRACT

Disclosed are methods for a channel state information (CSI) reporting. An example method may include receiving a discontinuous reception (DRX) configuration information for configuring a plurality of DRX groups including a first DRX group with a first cell configured with CSI reporting resources, determining at least one DRX group in active time from the plurality of DRX groups, and reporting CSI over the CSI reporting resources on the first cell based on the DRX configuration information and the active time. Related apparatuses and computer readable media are also disclosed.

20 Claims, 7 Drawing Sheets

(58) Field of Classification Search
CPC ......... H04W 52/0232; H04W 52/0235; H04W 52/0274; H04W 52/028; H04L 5/001; H04L 5/0053; H04L 5/0057; H04L 5/0091; H04L 5/0092; H04L 5/0094
See application file for complete search history.

(56) References Cited

U.S. PATENT DOCUMENTS

| | | | |
|---|---|---|---|
| 2019/0215896 | A1 | 7/2019 | Zhou et al. |
| 2019/0306915 | A1 | 10/2019 | Jin et al. |
| 2019/0349120 | A1 | 11/2019 | Cheng et al. |
| 2021/0136862 | A1* | 5/2021 | He .................. H04L 5/0094 |
| 2021/0306044 | A1* | 9/2021 | Nam ................. H04W 76/15 |

FOREIGN PATENT DOCUMENTS

| | | |
|---|---|---|
| CN | 110875812 A | 3/2020 |
| CN | 110943812 A | 3/2020 |
| CN | 110958093 A | 4/2020 |
| WO | 2019/192512 A1 | 10/2019 |

OTHER PUBLICATIONS

"3rd Generation Partnership Project; Technical Specification Group Radio Access Network; NR; Medium Access Control (MAC) protocol specification (Release 16)", 3GPP TS 38.321, V16.0.0, Mar. 2020, pp. 1-141.
"Introduction of secondary DRX group CR 38.321", 3GPP TSG-RAN2 Meeting #110-e, R2-2004858, Ericsson, Jun. 1-12, 2020, 5 pages.
"3rd Generation Partnership Project; Technical Specification Group Radio Access Network; NR; Radio Resource Control (RRC) protocol specification (Release 16)", 3GPP TS 38.331, V16.0.0, Mar. 2020, pp. 1-835.
International Search Report and Written Opinion received for corresponding Patent Cooperation Treaty Application No. PCT/CN2020/098163, dated Feb. 19, 2021, 11 pages.
Office action received for corresponding Japanese Patent Application No. 2022-580226, dated Mar. 5, 2024, (3 pages), English summary (3 pages), 6 pages total.
"Remaining issues for PDCCH-based power saving channel design", 3GPP TSG-RAN WG1 #100bis-e, R1-2002555, Agenda: 7.2.7.1, Qualcomm Incorporated, Apr. 20-24, 2020, 8 pages.
"Introduction of secondary DRX group 38.321 CR", 3GPP TSG-RAN WG2 Meeting #109 electronic, R2-2004554, Oppo, Jun. 1-12, 2020, pp. 1-5.
Extended European Search Report received for corresponding European Patent Application No. 20941908.4, dated Mar. 14, 2024, 9 pages.
"RAN1 impact analysis due to the introduction of secondary DRX cycle", 3GPP TSG RAN WG1 Meeting #100bis-e, R1-2002578, Agenda: 5, Huawei, Apr. 20-30, 2020, 8 pages.
"Further considerations on secondary DRX group", 3GPP TSG-RAN WG2 Meeting #109 electronic, R2-2004553, Agenda: 6.20.2.1, OPPO, Jun. 1-12, 2020, 6 pages.
Office Action received for corresponding Chinese Patent Application No. 202080102401.1, dated Mar. 29, 2024, 8 pages, no translation available.
Office Action issued by the Japanese Patent Office for Japanese Application No. 2022-580226 dated Dec. 4, 2024, (2 pages) with English translation (3 pages), 5 pages in total.
Qualcomm Incorporated, Remaining issues for PDCCH-based power saving channel design[online], 3GPP TSG RAN WG1 #100b_e R1-2002555, Internet<URL:https://www.3gpp.org/ftp/tsg_ran/WG1_RL1/TSGR1_100b_e/Docs/R1-2002555.zip>, Apr. 24, 2020 (8 pages), with Japanese language cover page (one page) and Japanese language closing page (one page), 10 pages in total.
Ericsson, Long and Short DRX cycle and CSI masking[online], 3GPP TSG RAN WG2 #103 R2-1811631, Internet<URL:http://www.3gpp.org/ftp/tsg_ran/WG2_RL2/TSGR2_103/Docs/R2-1811631.zip>, Aug. 24, 2018 (5 pages), with Japanese language cover page (one page) and Japanese language closing page (one page), 7 pages in total.
Office action received for corresponding Indian Patent Application No. 202347004112, dated Aug. 22, 2023, 7 pages.
Ericsson, Qualcomm, Samsung, InterDigital, Deutsche Telekom, Verizon, "Introduction of secondary DRX group", 3GPP TSG RAN WG2 #109bis-e R2-2003284, Apr. 30, 2020.
Office Action for Japanese Application No. 2022-580226 dated Aug. 6, 2025 with English translation.

* cited by examiner

METHODS AND APPARATUSES FOR CHANNEL STATE INFORMATION REPORTING

RELATED APPLICATION

This application was originally filed as PCT Application No. PCT/CN2020/098163, filed on Jun. 24, 2020, which is incorporated herein by reference in its entirety.

TECHNICAL FIELD

Various example embodiments relate to methods and apparatuses for a channel state information (CSI) reporting.

BACKGROUND

For example, in a communication system such as a Long Term Evolution (LTE) system or a New Radio (NR or 5G) system, a user equipment (UE) may report CSI with a base station (BS, e.g. an eNB in the LTE system or a gNB in the NR system) over CSI reporting resources.

SUMMARY

In a first aspect, a method is disclosed. The method may include receiving a discontinuous reception (DRX) configuration information for configuring a plurality of DRX groups including a first DRX group with a first cell configured with CSI reporting resources, determining at least one DRX group in active time from the plurality of DRX groups, and reporting CSI over the CSI reporting resources on the first cell based on the DRX configuration information and the active time.

In some embodiments, active time of the first DRX group may include the active time of the at least one DRX group.

In some embodiments, CSI for one or more cells in the at least one DRX group may be reported.

In some embodiments, in a case where the plurality of DRX groups may further include a second DRX group with a second cell configured with CSI reporting resources, CSI for one or more cells in the first DRX group may be reported over the CSI reporting resources on the first cell when the at least one DRX group includes the first DRX group, and the method may further include reporting CSI for one or more cells in the second DRX group over the CSI reporting resources on the second cell when the at least one DRX group includes the second DRX group.

In some embodiments, in a case where a CSI mask is configured, CSI may be reported if a DRX on duration timer for the at least one DRX group is running.

In some embodiments, the method may further include receiving a configuration on CSI reporting for one or more cells in the plurality of DRX groups, and reporting CSI for the one or more cells in the plurality of DRX groups according to the configuration.

In some embodiments, the first DRX group may correspond to a first timing advance group.

In some embodiments, CSI for one or more cells in active time may be reported.

In some embodiments, CSI for one or more cells being activated may be reported.

In a second aspect, a method is disclosed. The method may include transmitting a DRX configuration information for configuring a plurality of DRX groups including a first DRX group with a first cell configured with CSI reporting resources, determining at least one DRX group in active time from the plurality of DRX groups, and receiving CSI over the CSI reporting resources on the first cell based on the DRX configuration information and the active time.

In some embodiments, active time of the first DRX group may include the active time of the at least one DRX group.

In some embodiments, CSI for one or more cells in the at least one DRX group may be received.

In some embodiments, in a case where the plurality of DRX groups may further include a second DRX group with a second cell configured with CSI reporting resources, CSI for one or more cells in the first DRX group may be received over the CSI reporting resources on the first cell when the at least one DRX group includes the first DRX group, and the method may further include receiving CSI for one or more cells in the second DRX group over the CSI reporting resources with a second cell when the at least one DRX group includes the second DRX group.

In some embodiments, in a case where a CSI mask is configured, CSI may be received if a DRX on duration timer for the at least one DRX group is running.

In some embodiments, the method may further include transmitting a configuration on CSI reporting for one or more cells in the plurality of DRX groups, and receiving CSI for the one or more cells in the plurality of DRX groups according to the configuration.

In some embodiments, the first DRX group may correspond to a first timing advance group.

In some embodiments, CSI for one or more cells in active time may be received.

In some embodiments, CSI for one or more cells being activated may be received.

In a third aspect, an apparatus is disclosed. The apparatus may include at least one processor and at least one memory. The at least one memory may include computer program code, and the at least one memory and the computer program code may be configured to, with the at least one processor, cause the apparatus to perform receiving a DRX configuration information for configuring a plurality of DRX groups including a first DRX group with a first cell configured with CSI reporting resources, determining at least one DRX group in active time from the plurality of DRX groups, and reporting CSI over the CSI reporting resources on the first cell based on the DRX configuration information and the active time.

In some embodiments, active time of the first DRX group may include the active time of the at least one DRX group.

In some embodiments, CSI for one or more cells in the at least one DRX group may be reported.

In some embodiments, in case where the plurality of DRX groups may further include a second DRX group with a second cell configured with CSI reporting resources, CSI for one or more cells in the first DRX group may be reported over the CSI reporting resources on the first cell when the at least one DRX group includes the first DRX group, and the at least one memory and the computer program code may be configured to, with the at least one processor, cause the apparatus to further perform reporting CSI for one or more cells in the second DRX group over the CSI reporting resources on the second cell when the at least one DRX group includes the second DRX group.

In some embodiments, in a case where a CSI mask is configured, CSI may be reported if a DRX on duration timer for the at least one DRX group is running.

In some embodiments, the at least one memory and the computer program code may be configured to, with the at least one processor, cause the apparatus to further perform receiving a configuration on CSI reporting for one or more cells in the plurality of DRX groups, and reporting CSI for the one or more cells in the plurality of DRX groups according to the configuration.

In some embodiments, the first DRX group may correspond to a first timing advance group.

In some embodiments, CSI for one or more cells in active time may be reported.

In some embodiments, CSI for one or more cells being activated may be reported.

In a fourth aspect, an apparatus is disclosed. The apparatus may include at least one processor and at least one memory. The at least one memory may include computer program code, the at least one memory and the computer program code may be configured to, with the at least one processor, cause the apparatus to perform transmitting a DRX configuration information for configuring a plurality of DRX groups including a first DRX group with a first cell configured with CSI reporting resources, determining at least one DRX group in active time from the plurality of DRX groups, and receiving CSI over the CSI reporting resources on the first cell based on the DRX configuration information and the active time.

In some embodiments, active time of the first DRX group may include the active time of the at least one DRX group.

In some embodiments, CSI for one or more cells in the at least one DRX group may be received.

In some embodiments, in case where the plurality of DRX groups may further include a second DRX group with a second cell configured with CSI reporting resources, CSI for one or more cells in the first DRX group may be over the CSI reporting resources on the first cell when the at least one DRX group includes the first DRX group, and the at least one memory and the computer program code may be configured to, with the at least one processor, cause the apparatus to further perform receiving CSI for one or more cells in the second DRX group over the CSI reporting resources with a second cell when the at least one DRX group includes the second DRX group.

In some embodiments, in a case where a CSI mask is configured, CSI may be received if a DRX on duration timer for the at least one DRX group is running.

In some embodiments, the at least one memory and the computer program code may be configured to, with the at least one processor, cause the apparatus to further perform transmitting a configuration on CSI reporting for one or more cells in the plurality of DRX groups, and receiving CSI for the one or more cells in the plurality of DRX groups according to the configuration.

In some embodiments, the first DRX group may correspond to a first timing advance group.

In some embodiments, CSI for one or more cells in active time may be received.

In some embodiments, CSI for one or more cells being activated may be received.

In a fifth aspect, an apparatus is disclosed. The apparatus may include means for receiving a DRX configuration information for configuring a plurality of DRX groups including a first DRX group with a first cell configured with CSI reporting resources, means for determining at least one DRX group in active time from the plurality of DRX groups, and means for reporting CSI over the CSI reporting resources on the first cell based on the DRX configuration information and the active time.

In some embodiments, active time of the first DRX group may include the active time of the at least one DRX group.

In some embodiments, CSI for one or more cells in the at least one DRX group may be reported.

In some embodiments, in a case where the plurality of DRX groups may further include a second DRX group with a second cell configured with CSI reporting resources, CSI for one or more cells in the first DRX group may be reported over the CSI reporting resources on the first cell when the at least one DRX group includes the first DRX group, and the apparatus may further include means for reporting CSI for one or more cells in the second DRX group over the CSI reporting resources on the second cell when the at least one DRX group includes the second DRX group.

In some embodiments, in a case where a CSI mask is configured, CSI may be reported if a DRX on duration timer for the at least one DRX group is running.

In some embodiments, the apparatus may further include means for receiving a configuration on CSI reporting for one or more cells in the plurality of DRX groups, and means for reporting CSI for the one or more cells in the plurality of DRX groups according to the configuration.

In some embodiments, the first DRX group may correspond to a first timing advance group.

In some embodiments, CSI for one or more cells in active time may be reported.

In some embodiments, CSI for one or more cells being activated may be reported.

In a sixth aspect, an apparatus is disclosed. The apparatus may include means for transmitting a DRX configuration information for configuring a plurality of DRX groups including a first DRX group with a first cell configured with CSI reporting resources, means for determining at least one DRX group in active time from the plurality of DRX groups, and means for receiving CSI over the CSI reporting resources on the first cell based on the DRX configuration information and the active time.

In some embodiments, active time of the first DRX group may include the active time of the at least one DRX group.

In some embodiments, CSI for one or more cells in the at least one DRX group may be received.

In some embodiments, in a case where the plurality of DRX groups may further include a second DRX group with a second cell configured with CSI reporting resources, CSI for one or more cells in the first DRX group may be over the CSI reporting resources on the first cell when the at least one DRX group includes the first DRX group, and the apparatus may further include means for receiving CSI for one or more cells in the second DRX group over the CSI reporting resources with a second cell when the at least one DRX group includes the second DRX group.

In some embodiments, in a case where a CSI mask is configured, CSI may be received if a DRX on duration timer for the at least one DRX group is running.

In some embodiments, the apparatus may further include means for transmitting a configuration on CSI reporting for one or more cells in the plurality of DRX groups, and means for receiving CSI for the one or more cells in the plurality of DRX groups according to the configuration.

In some embodiments, the first DRX group may correspond to a first timing advance group.

In some embodiments, CSI for one or more cells in active time may be received.

In some embodiments, CSI for one or more cells being activated may be received.

In a seventh aspect, a computer readable medium is disclosed. The computer readable medium may include program instructions for causing an apparatus to perform receiving a DRX configuration information for configuring a plurality of DRX groups including a first DRX group with a first cell configured with CSI reporting resources, determining at least one DRX group in active time from the plurality of DRX groups, and reporting CSI over the CSI reporting resources on the first cell based on the DRX configuration information and the active time.

In some embodiments, active time of the first DRX group may include the active time of the at least one DRX group.

In some embodiments, CSI for one or more cells in the at least one DRX group may be reported.

In some embodiments, in case where the plurality of DRX groups may further include a second DRX group with a second cell configured with CSI reporting resources, CSI for one or more cells in the first DRX group may be reported over the CSI reporting resources on the first cell when the at least one DRX group includes the first DRX group, and the computer readable medium may further include program instructions for causing an apparatus to perform reporting CSI for one or more cells in the second DRX group over the CSI reporting resources on the second cell when the at least one DRX group includes the second DRX group.

In some embodiments, in a case where a CSI mask is configured, CSI may be reported if a DRX on duration timer for the at least one DRX group is running.

In some embodiments, the computer readable medium may further include program instructions for causing an apparatus to perform receiving a configuration on CSI reporting for one or more cells in the plurality of DRX groups, and reporting CSI for the one or more cells in the plurality of DRX groups according to the configuration.

In some embodiments, the first DRX group may correspond to a first timing advance group.

In some embodiments, CSI for one or more cells in active time may be reported.

In some embodiments, CSI for one or more cells being activated may be reported.

In an eighth aspect, a computer readable medium is disclosed. The computer readable medium may include program instructions for causing an apparatus to perform transmitting a DRX configuration information for configuring a plurality of DRX groups including a first DRX group with a first cell configured with CSI reporting resources, determining at least one DRX group in active time from the plurality of DRX groups, and receiving CSI over the CSI reporting resources on the first cell based on the DRX configuration information and the active time.

In some embodiments, active time of the first DRX group may include the active time of the at least one DRX group.

In some embodiments, CSI for one or more cells in the at least one DRX group may be received.

In some embodiments, in case where the plurality of DRX groups may further include a second DRX group with a second cell configured with CSI reporting resources, CSI for one or more cells in the first DRX group may be over the CSI reporting resources on the first cell when the at least one DRX group includes the first DRX group, and the computer readable medium may further include program instructions for causing an apparatus to perform receiving CSI for one or more cells in the second DRX group over the CSI reporting resources with a second cell when the at least one DRX group includes the second DRX group.

In some embodiments, in a case where a CSI mask is configured, CSI may be received if a DRX on duration timer for the at least one DRX group is running.

In some embodiments, the computer readable medium may further include program instructions for causing an apparatus to perform transmitting a configuration on CSI reporting for one or more cells in the plurality of DRX groups, and receiving CSI for the one or more cells in the plurality of DRX groups according to the configuration.

In some embodiments, the first DRX group may correspond to a first timing advance group.

In some embodiments, CSI for one or more cells in active time may be received.

In some embodiments, CSI for one or more cells being activated may be received.

BRIEF DESCRIPTION OF THE DRAWINGS

Some example embodiments will now be described, by way of non-limiting examples, with reference to the accompanying drawings.

DETAILED DESCRIPTION

A plurality of DRX groups may be configured to enhance power saving. Cells for a UE may belong to a plurality of DRX groups, and at least one cell of at least one DRX group may be configured with CSI reporting resources, wherein a DRX group may be a group of cells with the same active time. For example, one or more cells associated with a first frequency range (e.g., FR1) may be configured in a first DRX group, and one or more cells associated with a second frequency range (e.g., FR2) may be configured in a second DRX group. The different DRX groups may have separate DRX timers and may have separate active times. The active time may include the time while at least one of the DRX timers is running. The DRX timers include a DRX on duration timer (e.g. drx-onDurationTimer), a DRX inactivity timer (e.g. drx-InactivityTimer), a DRX retransmission timer downlink (e.g. drx-RetransmissionTimerDL), a DRX retransmission timer uplink (e.g. drx-RetransmissionTimerUL), a ra-ContentionResolutionTimer, or the like, as described in the technical standards (TS) of 3rd Generation Partnership Project (3GPP) (e.g. 3GPP TS 38.321).

A DRX cycle includes a DRX active time (i.e., on duration) during which the UE monitoring a physical downlink control channel (PDCCH) or Downlink Control Information (DCI) and a DRX period (i.e., off duration) during which the UE can skip reception of downlink channel for battery saving. The on duration timer indicates the duration of on time within one DRX cycle and the DRX inactivity timer specifies how long the UE should remain 'on state' (in active time) after reception of a PDCCH. When this timer is on, the UE remains in 'on state' which may extend the UE's active time into the period which is off duration otherwise. The DRX retransmission timer indicates the maximum number of consecutive PDCCH subframes the UE should remain active to wait an incoming retransmission (or transmitting retransmission) after the first available retransmission time. The DRX cycle includes a short DRX cycle and a long DRX cycle. The short DRX cycle which can be implemented within the DRX period (off duration) of the long DRX cycle. A DRX short cycle timer indicates consecutive number of subframes the UE shall follow the short DRX cycle after the DRX inactivity timer has expired.

Figure 1:
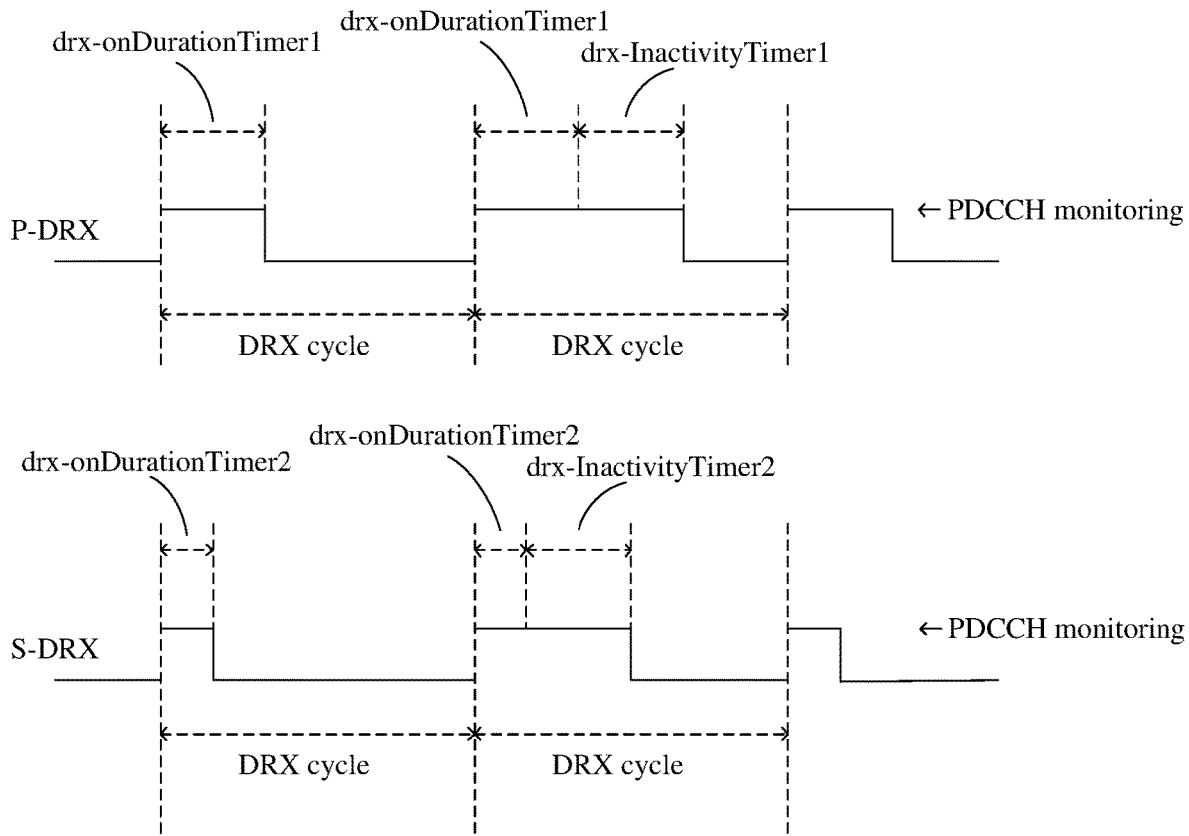
FIG. 1 illustrates an example of a plurality of DRX groups.

FIG. 1 illustrates an example of a plurality of DRX groups. In FIG. 1, for example a Primary DRX group (i.e., a P-DRX) associated with a first frequency FR1 and a Secondary DRX group (i.e., a S-DRX) associated with a second frequency FR2 are shown as an example of the plurality of DRX groups. The drx-onDurationTimer1 and drx-InactivityTimer1 are shown as an example of DRX timers for the P-DRX, and the drx-onDurationTimer2 and drx-InactivityTimer2 are shown as an example of DRX timers for the S-DRX. The drx-onDurationTimer1 and the drx-onDurationTimer2 may be for example the above-mentioned drx-onDurationTimer, and the drx-InactivityTimer1 and the drx-InactivityTimer2 may be for example the above-mentioned drx-InactivityTimer. In the other embodiments, the P-DRX may associated with the FR2 and the S-DRX may associated with the FR1, or the P-DRX and the S-DRX may associated with the same FR (e.g., FR1 or FR2).

As illustrated in FIG. 1, for example, a PDCCH for one or more cells (e.g. one or more serving cells or one or more cells being activated) in the P-DRX may be monitored by UE during the active time of the P-DRX, for example when the drx-onDurationTimer1 (and/or the drx-InactivityTimer1) is running, and the UE may stop monitoring PDCCH outside of the active time of P-DRX so as to save power. Similarly, in FIG. 1, PDCCH for one or more cells (e.g. one or more serving cells or one or more cells being activated) in S-DRX may be monitored by UE during the active time of S-DRX, for example when the drx-onDurationTimer2 (and/or the drx-InactivityTimer2) is running, and the UE may stop monitoring PDCCH outside of the active time of S-DRX so as to save power.

Figure 2:
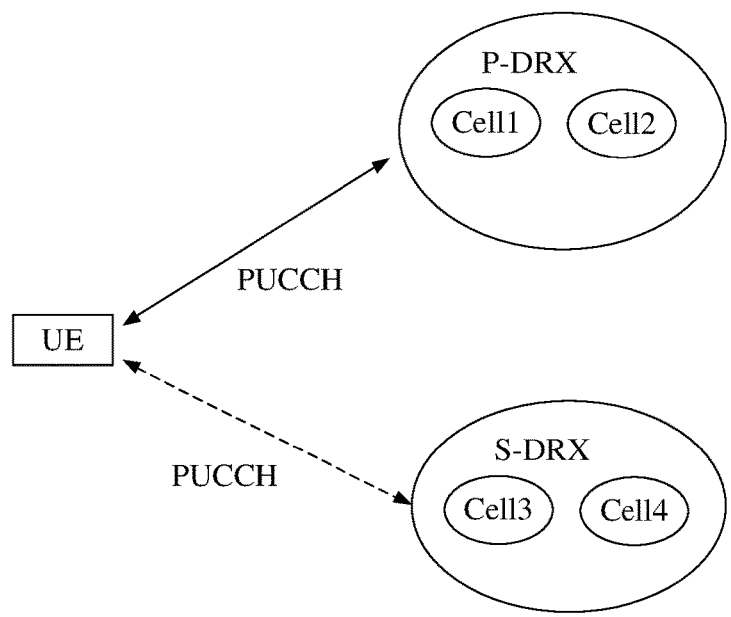
FIG. 2 illustrates an example of CSI reporting over CSI reporting resources.

FIG. 2 an example of CSI reporting resources. In FIG. 2, P-DRX and S-DRX are shown as an example of a plurality of DRX groups, Cell1 and Cell2 are shown as an example of cells in P-DRX and Cell3 and Cell4 are shown as an example of cells in S-DRX. In P-DRX, at least one cell may be configured with CSI reporting resources and the at least one cell with CSI reporting resources may be Primary Cell (PCell) or Primary Secondary Cell (PSCell). In addition, in S-DRX, a cell such as a Secondary Cell (SCell) may also be configured with CSI reporting resources, and in this case the SCell may be PUCCH SCell. If no cell in S-DRX is configured with CSI reporting resources, the CSI for one or more cells in S-DRX may be reported over CSI reporting resources on PCell. In FIG. 2, PUCCH is shown as an example of CSI reporting resources for UE to report CSI, and it is appreciated that the CSI reporting resources may also include physical uplink shared channel (PUSCH) and/or other radio resources.

Further, for example, one or more long DRX cycles and one or more short DRX cycles, which may be associated with a drx-ShortCycleTimer, may be configured for the plurality of DRX groups. For example, the length of long DRX cycle and the short DRX cycle may be configured to be common for both the above FR1 associated with the P-DRX and the above FR2 associated with the S-DRX. Thus, for example, in a case where the plurality of DRX groups and Long/Short DRX cycles are configured, there may be different activity patterns across the frequency of P-DRX and the frequency of S-DRX. For example, the cells in S-DRX may still follow the Short DRX cycle while the cells in P-DRX have already fallen back to the long DRX cycle.

Figure 3:
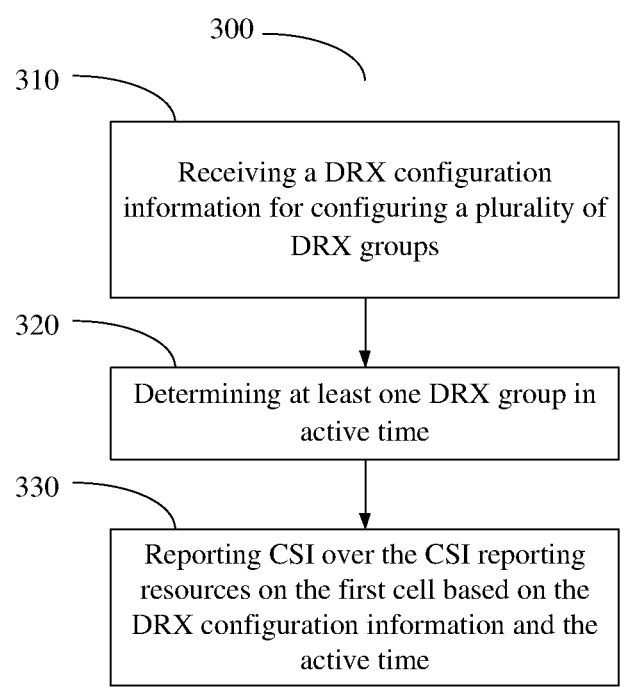
FIG. 3 illustrates an example method for a CSI reporting in an embodiment.

FIG. 3 illustrates an example method 300 for a CSI reporting in an embodiment, which may be performed in an apparatus such as a UE or at least a part of the UE.

As shown in FIG. 3, the example method 300 may include a step 310 of receiving DRX configuration information for configuring a plurality of DRX groups. For example, in the step 310, the DRX configuration information may be included in a high layer message (e.g., a Medium Access Control (MAC) message or a Radio Resource Control (RRC) message). The plurality of DRX groups may include a first DRX group with a first cell configured with CSI reporting resources. Further, the example method 300 may include a step 320 of determining at least one DRX group in active time from the plurality of DRX groups and a step 330 of reporting CSI based on the DRX configuration information and the active time over the CSI reporting resources. For example, if the at least one DRX group in active time determined in the step 320 includes the first DRX group, CSI for one or more cells (for example, one or more serving cells, or one or more cells being activated) in the first DRX group may be reported over the CSI reporting resources of the first cell in the step 330; if the at least one DRX group active time determined in the step 320 includes a second DRX different from the first DRX, CSI for one or more cells (for example, one or more serving cells, or one or more cells being activated) in the second DRX group may be reported over the CSI reporting resources of the first cell in the step 330, even the at least one group in active time does not include the first DRX group with the first cell providing the CSI reporting resources. The CSI is reported via the first cell even the CSI reporting resource (occasion) is not in the active time if the serving cells of the S-DRX for which the CSI report are during the active time. In another embodiment, besides the first cell in the first DRX group, if the plurality of DRX groups further include another DRX groups with a second cell providing CSI reporting resources for this DRX group, then depending on the DRX configuration information and the at least one DRX group in active time determined in the step 320, in the step 330, for example, CSI reporting resources of the first cell may be used to report CSI for one or more cells (for example, one or more serving cells, or one or more cells being activated) in the first DRX group when the first DRX group belongs to the at least one DRX group in active time, or may be used to report CSI for one or more cells (for example, one or more serving cells, or one or more cells being activated) in another DRX group which is different from the first DRX group but belongs to the at least DRX group in active time even the at least one DRX group in active time does not include the first DRX group, or the like. More examples and details will be presented below.

In connection with the examples in FIG. 1 or FIG. 2, it may be determined in the step 310 that a plurality of DRX groups are configured and a cell in the P-DRX (e.g. a PCell in the P-DRX) is configured to provide CSI reporting resources, e.g. PUCCH or PUSCH. For example, in a case where the S-DRX is not configured with CSI reporting resources, the CSI for one or more cells (for example, one or more serving cells, or one or more cells being activated) in at least one of the P-DRX and S-DRX may be reported over CSI reporting resources of the cell of P-DRX. The first cell may be for example the PCell or PScell.

In step 320, one or more DRX groups in active time may be determined. If at least one DRX group is in active time, in step 330, the UE reports the CSI over the CSI reporting resources on the first cell. The CSI may be measured in any suitable manner for example in step 320.

For example, when the P-DRX including the first cell is not in active time and the S-DRX is in active time, CSI for one or more cells (e.g. one or more serving cells or one or more cells being activated) in the S-DRX may be reported over the CSI reporting resources on the first cell. For example, CSI reporting on a cell may be independent from active time of the cell of which CSI reporting resources the CSI is reported on, and may depend on active time of the cell(s) that the CSI is reported for. Thus if a cell that CSI is reported for is in active time, CSI is reported for that cell regardless if the cell of which CSI reporting resources the CSI is reported on is in active time or not. In other words, even though the P-DRX group is in the DRX period (i.e., off duration), the UE is able to report the CSI of the cell(s) of the S-DRX group to the gNB via the CSI reporting resources configured in the P-DRX group when the S-DRX group is in an active time. In this case, the CSI reporting resources have been configured by the gNB as a legacy method (e.g., a CSI configuration Information Element (IE) in an RRC message).

When both P-DRX and S-DRX are in active time, CSI for one or more cells (e.g. one or more serving cells or one or more cells being activated) in P-DRX and one or more cells (e.g. one or more serving cells or one or more cells being activated) in S-DRX may be reported over the CSI reporting resources on the first cell.

If neither P-DRX nor S-DRX is in active time, CSI may be not reported.

Thus PDCCH monitoring may be independent for the two DRX groups but CSI reporting may depend on the active time of the both DRX groups, so that for the DRX group configured with CSI reporting resources, the UE may not monitor PDCCH regardless of whether the CSI reporting is performed. Therefore, power consumption of the apparatus can be reduced.

In an embodiment, active time of the first DRX group (or P-DRX) may include the active time of the at least one DRX group. Taking the above-mentioned P-DRX and S-DRX as an example of the DRX groups, the P-DRX may be also in active time if the S-DRX is in active time.

For example, the CSI for one or more cells (e.g. one or more serving cells, or one or more cells being activated) in P-DRX may be reported over the CSI reporting resources on the first cell when the P-DRX is in active time and the S-DRX is not in active time. In addition, the CSI for one or more cells (e.g. one or more serving cells, or one or more cells being activated) in both P-DRX and S-DRX may be reported over the CSI reporting resources on the first cell when S-DRX is in active time.

In this embodiment, for example, the drx-ShortCycleTimer (e.g. as provided in 3GPP TS 38.321) for the DRX group configured with CSI reporting resources may be not affected and the DRX group can stay in short cycle when the other DRX group is using short cycle, or the CSI reporting is according to short Cycle if at least one DRX group for which CSI is being reported is using short cycle.

In an embodiment, CSI for one or more cells (e.g. one or more serving cells, or one or more cells being activated) in the at least one DRX group in active time may be reported in the step 330. Taking the above-mentioned P-DRX and S-DRX as an example of the DRX groups, the UE may report over the CSI reporting resources the CSI for serving cells of the DRX groups in active time.

For example, if P-DRX is not in active time and S-DRX is in active time, the UE may report over the CSI reporting resources on the first cell of P-DRX the CSI for the serving cells (or one or more cells being activated) in the S-DRX in active time and may not report the CSI for other cells. If S-DRX is not in active time and P-DRX is in active time, the UE may report over the CSI reporting resources on the first cell of P-DRX the CSI for the serving cells (or one or more cells being activated) in the P-DRX in active time and may not report the CSI for other cells. If the P-DRX is not in active time, the CSI for serving cells in the P-DRX may be not reported, and if S-DRX is not in active time, the CSI for serving cells in S-DRX may be not reported.

In this embodiment, the UE may report the CSI for less cells and less CSI resources may be used. Separate CSI reporting resources for Serving Cells in P-DRX group from those in S-DRX group may be configured by a network entity. Power consumption may therefore be reduced.

In an embodiment, the plurality of DRX groups may further include a second DRX group with a second cell configured with CSI reporting resources. In such a case, the step 330 may include reporting CSI for one or more cells in the first DRX group over the CSI reporting resources on the first cell when the at least one DRX group includes the first DRX group, and the example method 300 may further include reporting CSI for one or more cells in the second DRX group over the CSI reporting resources on the second cell when the at least one DRX group includes the second DRX group. Thus, CSI for one or more cells in a DRX group may be reported over the CSI reporting resources on a cell within its own group, so that CSI reporting for a DRX group may be independent from CSI reporting for another DRX group, and CSI for different DRX groups may be reported when the corresponding DRX group is in active time.

Figure 4:
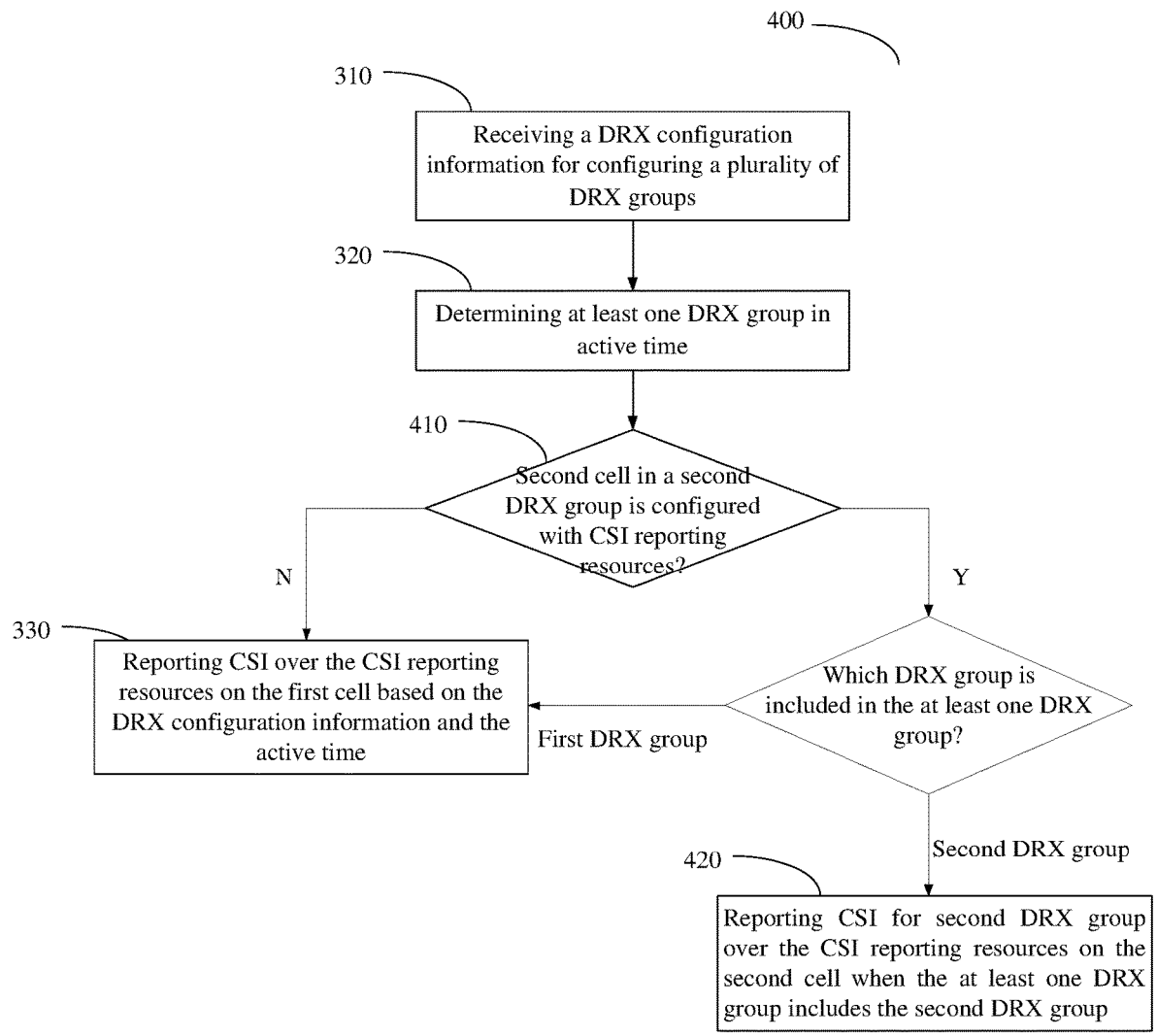
FIG. 4 illustrates another example method for a CSI reporting in an embodiment.

FIG. 4 illustrates an example method 400 for a CSI reporting in an embodiment which may include the steps of the example method 300 and additional steps 410 and 420. Taking the above-mentioned P-DRX and S-DRX as an example of the DRX groups. In the step 410, it may be determined whether the plurality of DRX groups further include a second DRX group with a second cell configured with CSI reporting resources. If there is no such a second cell ("N" branch in the step 410), the step 330 may include reporting CSI for one or more cells (e.g. one or more serving cells, or one or more cells being activated) in the at least one DRX group over the CSI reporting resources on the first cell. If a second cell of the second DRX group is configured with CSI reporting resources ("Y" branch in the step 410), the step 330 may include reporting CSI for one or more cells in the first DRX group over the CSI reporting resources on the first cell when the at least one DRX group includes the first DRX group, and in the step 420, CSI for one or more cells in the second DRX group may be reported over the CSI reporting resources on the second cell when the at least one DRX group in active time includes the second DRX group.

For example, if a cell of a first DRX group (e.g. P-DRX) is configured with CSI reporting resources such as PUCCH and/or PUSCH resources and a cell of a second DRX group (e.g. S-DRX) is configured with CSI reporting resources such as PUCCH and/or PUSCH resources, the CSI reporting for P-DRX and S-DRX may work independently based on active time of P-DRX and S-DRX, respectively. If the second DRX group is not configured with CSI reporting resources ("N" branch in step 410), the step 330 may include CSI reporting for P-DRX and S-DRX may be over the same CSI reporting resources on the cell of the P-DRX. It is appreciated that the steps of method 400 is not limited to the order shown in FIG. 4. For example, the step 410 may also be performed before step 320.

For example, the CSI for one or more cells in the P-DRX may be reported over the CSI reporting resources on the first cell (e.g. PCell) and/or the CSI for one or more cells in the S-DRX may be reported over the CSI reporting resources on the second cell (e.g. PUCCH SCell). For example, in a case where the P-DRX is not in active time and the CSI reporting resources do not include CSI reporting for serving cells in the S-DRX, CSI may be not reported.

Figure 5:
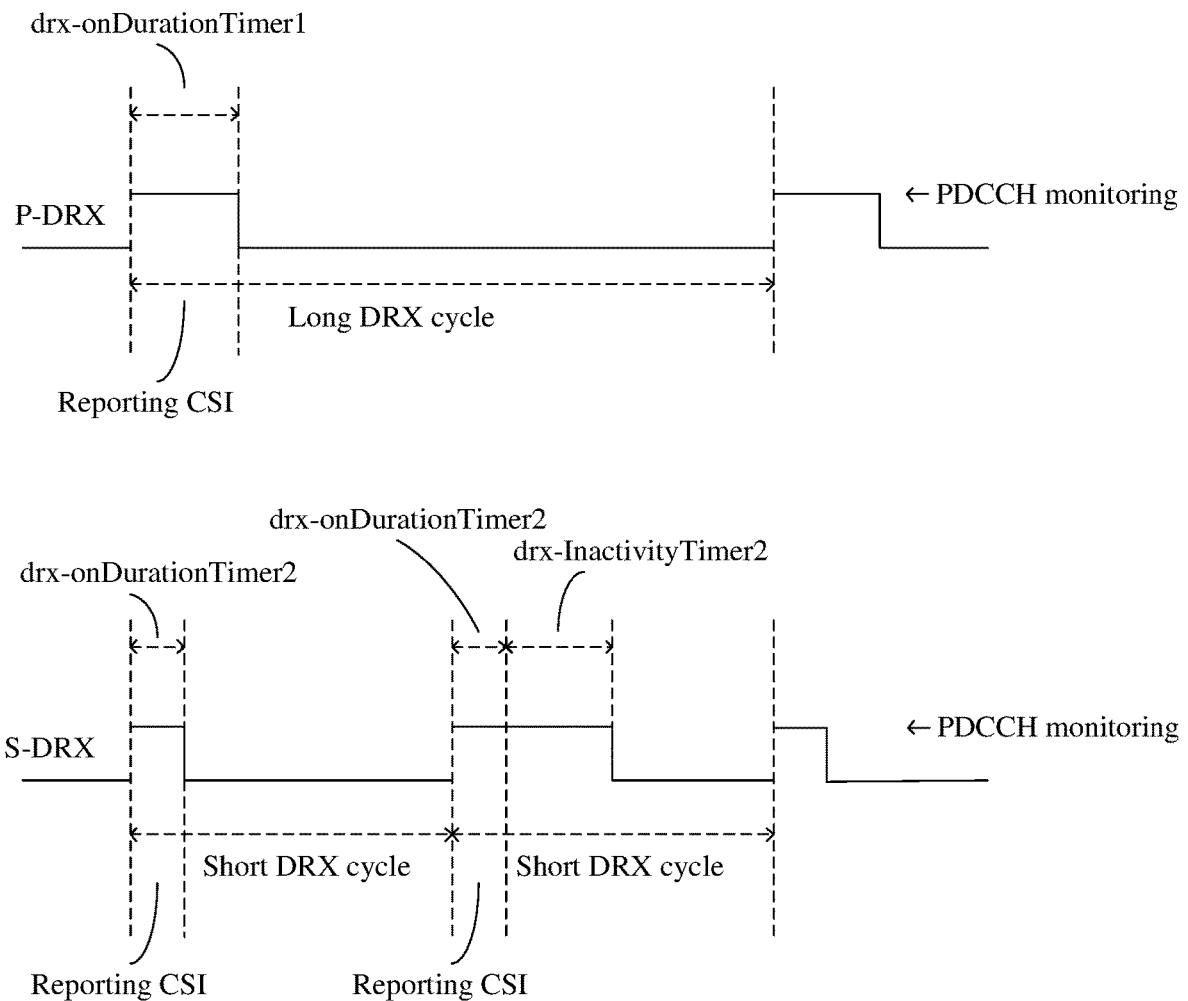
FIG. 5 illustrates another example of a plurality of DRX groups.

In an embodiment, in a case where a CSI mask is configured, CSI may be reported if a DRX on duration timer for the at least one DRX group is running. FIG. 5 illustrates another example of a plurality of DRX groups. As shown in FIG. 5, for example, P-DRX may be in long DRX cycle and S-DRX may be in short DRX cycle. For example, in a case where a CSI mask is configured, when the drx-onDurationTimer2 is running but the drx-onDurationTimer1 is not running, the CSI may be reported over CSI reporting resources if drx-onDurationTimer2 is running.

For example, in a case where S-DRX is not configured with CSI reporting resources and CSI mask is configured, the CSI for one or more cells (e.g. serving cells or cells being activated) in S-DRX may be reported over CSI reporting resources on the first cell of P-DRX if drx-onDurationTimer2 of the S-DRX is running. The CSI reporting resources have been configured by a high layer signaling (e.g., MAC or RRC messages) and the CSI reporting resources are restricted in the DRX period (i.e., off duration), which may cause the UE to be unable to report when it is not in active time. However, the UE of the embodiment is configured to report the CSI in the CSI reporting resources during the DRX period if the cells of another DRX group which are subjects of the CSI reporting are in active time. The CSI reporting is for the cells that are in active time, so the UE is anyway measuring those cells. In the example shown in FIG. 5, CSI for one or more cells in P-DRX may be reported when drx-onDurationTimer1 is running and CSI for one or more cells in S-DRX may be reported when drx-onDurationTimer2 is running. Further, for example, CSI for one or more cells in S-DRX may be reported over CSI reporting resources on the first cell of P-DRX when drx-onDurationTimer1 is not running and drx-onDurationTimer2 is running. In addition, for example, CSI for one or more cells in S-DRX may not be reported when drx-onDurationTimer2 is not running.

In this example embodiment, the CSI for a DRX group with no CSI reporting resources can be reported when the drx-onDurationTimer of the DRX group with the cell configured with CSI reporting resources is not running, e.g., in long DRX and when CSI-mask is configured. For example, in a case where CSI masking (CSI-mask) is setup by upper layers but a DRX group has no drx-onDurationTimer running, CSI for this DRX group may be not reported.

In an embodiment, the example method may further include receiving a configuration (e.g. a RRC configuration) on CSI reporting for one or more cells in the plurality of DRX groups, and reporting CSI for the one or more cells in the plurality of DRX groups according to the configuration. For example, the UE may report CSI for the serving cells in active time or for the serving cells according to e.g. RRC configuration and regardless of the active time in the given DRX group.

In an embodiment, the first DRX group may correspond to a first timing advance group. A timing advance group (TAG) may be configured to correspond to a DRX group. For example, a primary TAG (PTAG) may be configured for the cells associated to P-DRX and a secondary TAG (STAG) may be configured for the cells associated to S-DRX.

In various embodiments, CSI for one or more cells in active time is reported. For example, CSI for one or more cells in active time may be reported and CSI for one or more cells not in active time may not be reported.

In various embodiments, CSI for one or more cells being activated is reported. For example, CSI for one or more cells being activated may be reported and CSI for one or more cells not being activated may not be reported.

Figure 6:
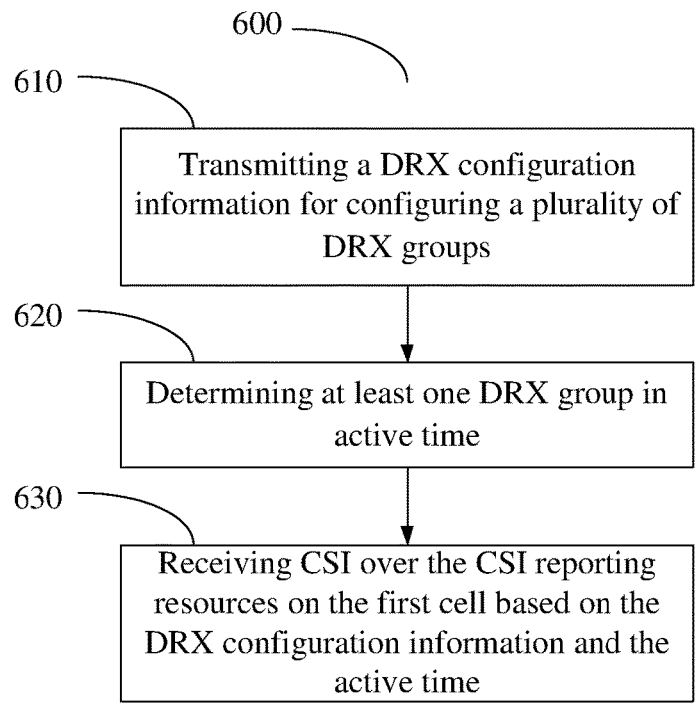
FIG. 6 illustrates an example method for a CSI reporting in an embodiment.

FIG. 6 illustrates an example method 600 for a CSI reporting procedure in an embodiment, which may be performed in an apparatus such as a BS or at least a part of the BS to cooperate with the example method 300 or 400.

As shown in FIG. 6, the example method 600 may include a step 610 of transmitting a DRX configuration information for configuring a plurality of DRX groups. The DRX configuration information may be included in a high layer message (e.g., MAC or RRC message). The plurality of DRX groups include a first DRX group with a first cell configured with CSI reporting resources. The example method 600 may include a step 620 of determining at least one DRX group in active time from the plurality of DRX groups and a step 630 of receiving CSI over the CSI reporting resources on the first cell based on the DRX configuration information and the active time.

The example method 600 may be performed for example to cooperate with the example method 300 or 400. Thus, various features and aspects described above with respect to the example method 300 or 400 may also be applied to or included in or combined with the example method 600.

For example, in the example method 600, active time of the first DRX group may include active time of the at least one DRX group.

For example, in the example method 600, CSI for one or more cells in the at least one DRX group may be received.

For example, in the example method 600, in a case where the plurality of DRX groups may further include a second DRX group with a second cell configured with CSI reporting resources, CSI for one or more cells in the first DRX group may be received over the CSI reporting resources on the first cell when the at least one DRX group includes the first DRX group, and the method 600 may further include receiving CSI for one or more cells in the second DRX group over the CSI reporting resources with a second cell when the at least one DRX group includes the second DRX group.

For example, in the example method 600, in a case where a CSI mask is configured, CSI may be received if a DRX on duration timer for the at least one DRX group is running.

In some embodiments, the method 600 may further include transmitting a configuration on CSI reporting for one or more cells in the plurality of DRX groups, and receiving CSI for the one or more cells in the plurality of DRX groups according to the configuration.

For example, in the example method 600, the first DRX group may correspond to a first timing advance group.

For example, in the example method 600, CSI for one or more cells in active time may be received.

For example, in the example method 600, CSI for one or more cells being activated may be received.

In the above example embodiments, two DRX groups, P-DRX and S-DRX, may be taken as an example, and it is appreciated that the example embodiments can work where more DRX groups are configured. When a plurality of DRX groups is configured, the availability of reporting of CSI information from the UE to BS may be ensured. It is appreciated that the UE may refer to an apparatus such as a UE or at least a part of the UE, and the BS may refer to an apparatus such as a BS or at least a part of the BS.

Figure 7:
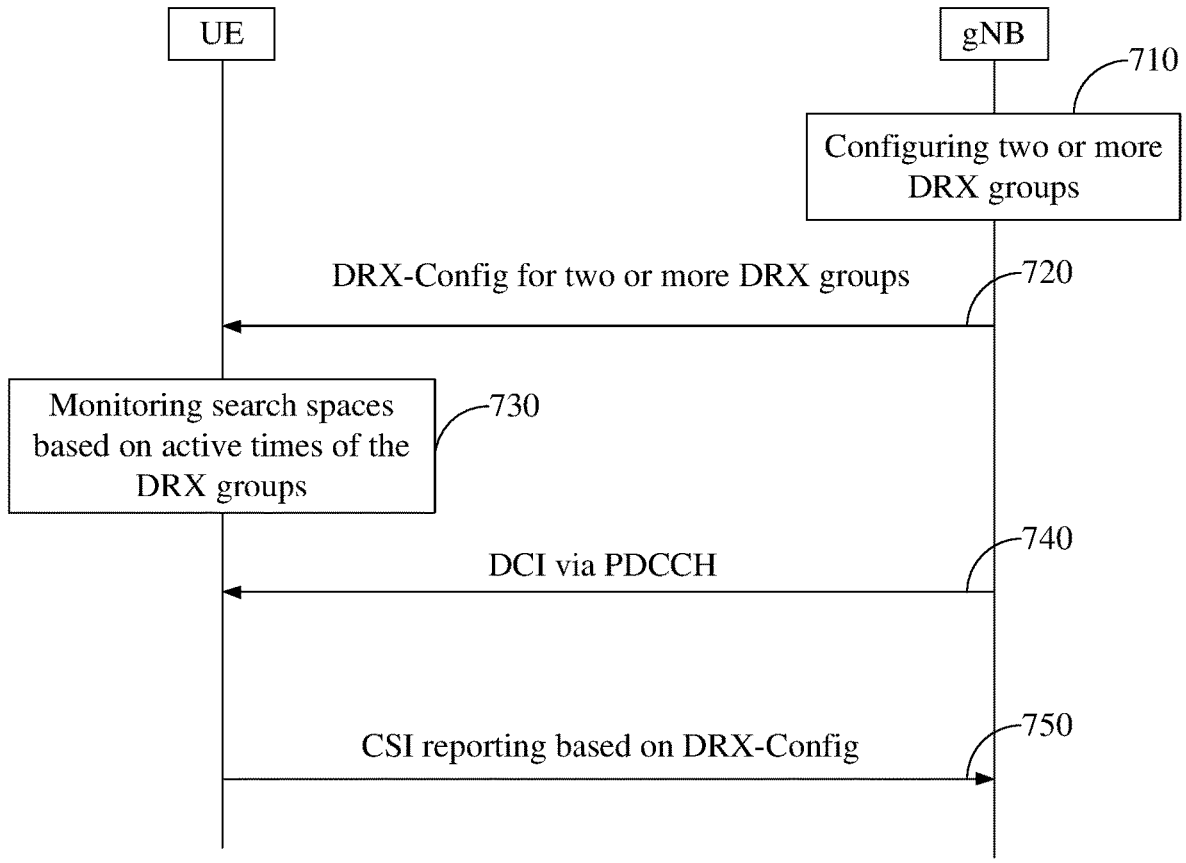
FIG. 7 illustrates another example method for a CSI reporting in an embodiment.

FIG. 7 illustrates another example method for a CSI reporting in an embodiment.

A gNB configures two or more DRX groups for a UE or UEs covered by the gNB (710).

The gNB transmits a high layer message (e.g., RRC) including DRX configuration information (also called DRX-Config herein) elements for configuring the two or more DRX groups to the UE (720). The DRX configuration information elements includes at least one of a drx-onDurationTimer, a drx-InactivityTimer, a DRX retransmission timer downlink (i.e., drx-RetransmissionTimerDL), a DRX retransmission timer uplink (i.e., drx-RetransmissionTimerUL), a ra-ContentionResolutionTimer, drx-LongCycleStartOffset, or drx-ShortCycle parameters for the first DRX group and the second DRX group.

A medium access control (MAC) entity of the UE may be configured by the RRC message with a DRX functionality that controls the UE's PDCCH monitoring activity for the MAC entity. When using DRX operation, the MAC entity of the UE shall also monitor PDCCH according to embodiments described above. When the UE is in an RRC_CONNECTED state and if the DRX is configured for the activated Serving Cells, the MAC entity of the UE may monitor search spaces for decoding PDCCH discontinuously using one of the DRX operations explained above embodiments and FIG. 1 to FIG. 6 (730).

In the active time of the configured DRX cycles, the UE may decode at least one DCI which has been transmitted via the PDCCHs in at least one of the two or more DRX groups (740).

When DRX cycles for the two or more DRX groups are configured, the Active Time for a DRX group (e.g., a first DRX group) includes the time while another DRX group (e.g., a second DRX group) is in Active Time if the DRX group is configured with PUSCH and/or PUCCH resources for CSI reporting of any Serving Cell in the another DRX group. Accordingly, the UE performs CSI reporting based on the configured active times of the two or more DRX groups (750).

The step 750 may be performed based on the embodiments described above, for example the embodiments explained for FIG. 1 to FIG. 6.

As a further embodiment, when the two or more DRX groups are configured and if one DRX group includes PUCCH and/or PUSCH resources for CSI reporting, the MAC entity of the UE does not report CSI on PUCCH and semi-persistent CSI configured on PUSCH for the Serving Cell(s) in the DRX group, in case the two or more DRX groups would not be in Active Time.

As a still further embodiment, when the two or more DRX groups are configured and if one DRX group includes PUCCH and/or PUSCH resources for CSI reporting, the MAC entity of the UE does not report CSI on PUCCH and semi-persistent CSI configured on PUSCH in any DRX group in case the CSI reporting resources for CSI reporting do not include CSI reporting for Serving Cell(s) in another DRX group of the two or more DRX groups.

As a still further embodiment, in current symbol n, if another DRX group would not be in Active Time considering grants/assignments scheduled for serving cell(s) in another DRX Group and DRX Command MAC CE/Long DRX Command MAC CE received and Scheduling Request sent until 4 ms prior to symbol n when evaluating all DRX Active Time conditions, the UE does not report CSI on PUCCH and semi-persistent CSI configured on PUSCH in any DRX group.

As a still further embodiment, if CSI masking (csi-Mask) is setup by upper layers, the UE does not report CSI on PUCCH in current symbol n, if drx-onDurationTimer would not be running in any DRX group considering grants/assignments scheduled for Serving Cell(s) in any DRX group and DRX Command MAC CE/Long DRX Command MAC CE received until 4 ms prior to symbol n when evaluating all DRX Active Time conditions as configured.

It is appreciated that although the above example is described in a context of NR system, the method may be applied to other communication systems such LTE system.

Figure 8:
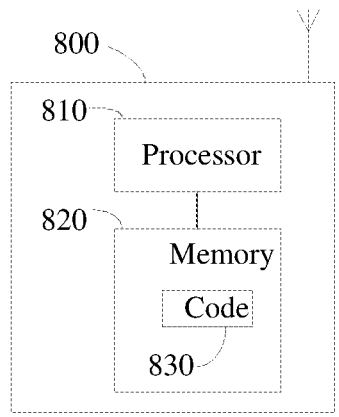
FIG. 8 illustrates an example apparatus for CSI reporting in an embodiment.

FIG. 8 illustrates an example apparatus 800 for CSI reporting procedure in an embodiment, which, for example, may be the UE in the above examples.

As shown in FIG. 8, the example apparatus 800 may include at least one processor 810 and at least one memory 820 that may include computer program code 830. The at least one memory 820 and the computer program code 830 may be configured to, with the at least one processor 810, cause the apparatus 800 at least to perform at least one of the example method 300 and/or the example method 400 described above.

In various example embodiments, the at least one processor 810 in the example apparatus 800 may include, but not limited to, at least one hardware processor, including at least one microprocessor such as a central processing unit (CPU), a portion of at least one hardware processor, and any other suitable dedicated processor such as those developed based on for example Field Programmable Gate Array (FPGA) and Application Specific Integrated Circuit (ASIC). Further, the at least one processor 810 may also include at least one other circuitry or element not shown in FIG. 8.

In various example embodiments, the at least one memory 820 in the example apparatus 800 may include at least one storage medium in various forms, such as a volatile memory and/or a non-volatile memory. The volatile memory may include, but not limited to, for example, a random-access memory (RAM), a cache, and so on. The non-volatile memory may include, but not limited to, for example, a read only memory (ROM), a hard disk, a flash memory, and so on. Further, the at least memory 820 may include, but are not limited to, an electric, a magnetic, an optical, an electromagnetic, an infrared, or a semiconductor system, apparatus, or device or any combination of the above.

Further, in various example embodiments, the example apparatus 800 may also include at least one other circuitry, element, and interface, for example at least one I/O interface, at least one antenna element, and the like.

In various example embodiments, the circuitries, parts, elements, and interfaces in the example apparatus 800, including the at least one processor 810 and the at least one memory 820, may be coupled together via any suitable connections including, but not limited to, buses, crossbars, wiring and/or wireless lines, in any suitable ways, for example electrically, magnetically, optically, electromagnetically, and the like.

It is appreciated that the structure of the apparatus on the side of the UE is not limited to the above example apparatus 800.

Figure 9:
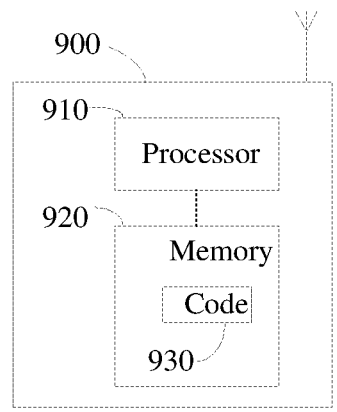
FIG. 9 illustrates an example apparatus for CSI reporting in an embodiment.

FIG. 9 illustrates an example apparatus 900 for CSI reporting procedure in an embodiment, which, for example, may be the BS in the above examples.

As shown in FIG. 9, the example apparatus 900 may include at least one processor 910 and at least one memory 920 that may include computer program code 930. The at least one memory 920 and the computer program code 930 may be configured to, with the at least one processor 910, cause the apparatus 900 at least to perform at least one of the example method 600 described above.

In various example embodiments, the at least one processor 910 in the example apparatus 900 may include, but not limited to, at least one hardware processor, including at least one microprocessor such as a central processing unit (CPU), a portion of at least one hardware processor, and any other suitable dedicated processor such as those developed based on for example Field Programmable Gate Array (FPGA) and Application Specific Integrated Circuit (ASIC). Further, the at least one processor 910 may also include at least one other circuitry or element not shown in FIG. 9.

In various example embodiments, the at least one memory 920 in the example apparatus 900 may include at least one storage medium in various forms, such as a volatile memory and/or a non-volatile memory. The volatile memory may include, but not limited to, for example, a random-access memory (RAM), a cache, and so on. The non-volatile memory may include, but not limited to, for example, a read only memory (ROM), a hard disk, a flash memory, and so on. Further, the at least memory 920 may include, but are not limited to, an electric, a magnetic, an optical, an electromagnetic, an infrared, or a semiconductor system, apparatus, or device or any combination of the above.

Further, in various example embodiments, the example apparatus 900 may also include at least one other circuitry, element, and interface, for example at least one I/O interface, at least one antenna element, and the like.

In various example embodiments, the circuitries, parts, elements, and interfaces in the example apparatus 900, including the at least one processor 910 and the at least one memory 920, may be coupled together via any suitable connections including, but not limited to, buses, crossbars, wiring and/or wireless lines, in any suitable ways, for example electrically, magnetically, optically, electromagnetically, and the like.

It is appreciated that the structure of the apparatus on the side of the base station is not limited to the above example apparatus 900.

Figure 10:
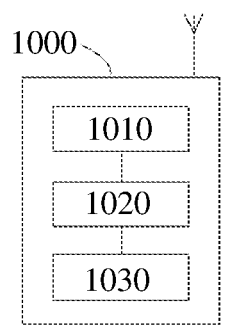
FIG. 10 illustrates an example apparatus for CSI reporting in an embodiment.

FIG. 10 illustrates an example apparatus 1000 for CSI reporting procedure in an embodiment, which, for example, may be the UE in the above examples.

As shown in FIG. 10, the example apparatus 1000 may include means 1010 for performing the step 310 of the example method 300, means 1020 for performing the step 320 of the example method 300, and means 1030 for performing the step 330 of the example method 300. In one or more another example embodiments, at least one I/O interface, at least one antenna element, and the like may also be included in the example apparatus 1000.

In some example embodiments, examples of means in the example apparatus 1000 may include circuitries. For example, an example of means 1010 may include a circuitry configured to perform the step 310 of the example method 300, an example of means 1020 may include a circuitry configured to perform the step 320 of the example method 300, and an example of means 1030 may include a circuitry configured to perform the step 330 of the example method 300. In some example embodiments, examples of means may also include software modules and any other suitable function entities.

The term "circuitry" throughout this disclosure may refer to one or more or all of the following: (a) hardware-only circuit implementations (such as implementations in only analog and/or digital circuitry); (b) combinations of hardware circuits and software, such as (as applicable) (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to one or all uses of this term in this disclosure, including in any claims. As a further example, as used in this disclosure, the term circuitry also covers an implementation of merely a hardware circuit or processor (or multiple processors) or portion of a hardware circuit or processor and its (or their) accompanying software and/or firmware. The term circuitry also covers, for example and if applicable to the claim element, a baseband integrated circuit or processor integrated circuit for a mobile device or a similar integrated circuit in server, a cellular network device, or other computing or network device.

Figure 11:
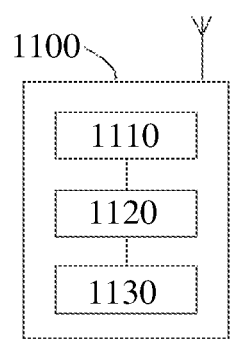
FIG. 11 illustrates an example apparatus for CSI reporting in an embodiment.

FIG. 11 illustrates an example apparatus 1100 for CSI reporting procedure in an embodiment, which, for example, may be the BS in the above examples.

As shown in FIG. 11, the example apparatus 1100 may include means 1110 for performing the step 610 of the example method 600, means 1120 for performing the step 620 of the example method 600, and means 1130 for performing the step 630 of the example method 600. In one or more another example embodiments, at least one I/O interface, at least one antenna element, and the like may also be included in the example apparatus 1100.

In some example embodiments, examples of means in the example apparatus 1100 may include circuitries. For example, an example of means 1110 may include a circuitry configured to perform the step 610 of the example method 600, an example of means 1120 may include a circuitry configured to perform the step 620 of the example method 600, and an example of means 1130 may include a circuitry configured to perform the step 630 of the example method 600. In some example embodiments, examples of means may also include software modules and any other suitable function entities.

Throughout the drawings, same or similar reference numbers indicate same or similar elements. A repetitive description on the same elements would be omitted.

Another example embodiment may be related to a computer readable medium having such computer program codes or instructions stored thereon. In various example embodiments, such a computer readable medium may include at least one storage medium in various forms such as a volatile memory and/or a non-volatile memory. The volatile memory may include, but not limited to, for example, a RAM, a cache, and so on. The non-volatile memory may include, but not limited to, a ROM, a hard disk, a flash memory, and so on.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While some example embodiments have been described, these embodiments have been presented by way of example, and are not intended to limit the scope of the disclosure. Indeed, the apparatus, methods, and systems described herein may be embodied in a variety of other forms; furthermore, various omissions, substitutions and changes in the form of the methods and systems described herein may be made without departing from the spirit of the disclosure. For example, while blocks are presented in a given arrangement, alternative embodiments may perform similar functionalities with different components and/or circuit topologies, and some blocks may be deleted, moved, added, subdivided, combined, and/or modified. At least one of these blocks may be implemented in a variety of different ways. The order of these blocks may also be changed. Any suitable combination of the elements and acts of the various embodiments described above can be combined to provide further embodiments. The accompanying claims and their equivalents are intended to cover such forms or modifications as would fall within the scope and spirit of the disclosure.

What is claimed is:

1. A method comprising:
   receiving, by a user equipment from a base station, a discontinuous reception (DRX) configuration information for configuring a plurality of DRX groups including a first DRX group with a first cell configured with channel state information (CSI) reporting resources;
   determining, by the user equipment, whether the first DRX group of the plurality of DRX groups is in active time; and
   determining, by the user equipment, whether a DRX on duration timer for the first DRX group is running or not,
   wherein the first DRX group is a group of cells having a same active time,
   wherein, in a case a CSI mask is configured, the first DRX group is in the active time, and the DRX on duration timer is running, CSI for one or more cells in the first DRX group is reported via the configured CSI reporting resources on the first cell, and
   wherein, in a case the CSI mask is configured, the first DRX group is in the active time, and the DRX on duration timer is not running, the CSI for one or more cells in the first DRX group is not reported via the configured CSI reporting resources on the first cell.

2. The method of claim 1, wherein the active time of the first DRX group includes the active time of at least one DRX group.

3. The method of claim 1, wherein in a case where the plurality of DRX groups further include a second DRX group with a second cell configured with CSI reporting resources, CSI for one or more cells in the first DRX group is reported over the CSI reporting resources on the first cell when at least one DRX group includes the first DRX group, and the method further comprises:
   reporting, by the user equipment, CSI for one or more cells in the second DRX group over the CSI reporting resources on the second cell when the at least one DRX group includes the second DRX group.

4. The method of claim 1, wherein the DRX on duration timer of the first DRX group is longer than a DRX on duration timer of a second DRX group.

5. A method comprising:
   transmitting, by a base station to a user equipment, a discontinuous reception (DRX) configuration information for configuring a plurality of DRX groups including a first DRX group with a first cell configured with channel state information (CSI) reporting resources; and
   receiving, by the base station, CSI for one or more cells in the first DRX group over the CSI reporting resources on the first cell based on the DRX configuration information, when a CSI mask is configured, the first DRX group is in active time, and a DRX on duration timer is running,
   wherein, in a case the CSI mask is configured and the DRX on duration timer is not running, the CSI for one or more cells in the first DRX group is not reported via the configured CSI reporting resources on the first cell, and
   wherein the first DRX group is a group of cells having a same active time.

6. The method of claim 5, wherein the active time of the first DRX group includes the active time of at least one DRX group.

7. The method of claim 5, wherein in a case where the plurality of DRX groups further include a second DRX group with a second cell configured with CSI reporting resources, CSI for one or more cells in the first DRX group is received over the CSI reporting resources on the first cell when at least one DRX group includes the first DRX group, and the method further comprises:
   receiving, by the base station, CSI for one or more cells in the second DRX group over the CSI reporting resources when the at least one DRX group includes the second DRX group.

8. The method of claim 5, wherein the DRX on duration timer of the first DRX group is longer than a DRX on duration timer of a second DRX group.

9. An apparatus comprising:
at least one processor; and
at least one memory comprising computer program code, the at least one memory and the computer program code being configured to, with the at least one processor, cause the apparatus to perform:
receiving, from a base station, a discontinuous reception (DRX) configuration information for configuring a plurality of DRX groups including a first DRX group with a first cell configured with channel state information (CSI) reporting resources;
determining whether the first DRX group of the plurality of DRX groups is in active time; and
determining whether a DRX on duration timer for the first DRX group is running or not,
wherein the first DRX group is a group of cells having a same active time,
wherein, in a case a CSI mask is configured, the first DRX group is in the active time, and the DRX on duration timer is running, CSI for one or more cells in the first DRX group is reported via the configured CSI reporting resources on the first cell, and
wherein, in a case the CSI mask is configured, the first DRX group is in the active time, and the DRX on duration timer is not running, the CSI for one or more cells in the first DRX group is not reported via the configured CSI reporting resources on the first cell.

10. The apparatus of claim 9, wherein the active time of the first DRX group includes the active time of at least one DRX group.

11. The apparatus of claim 9, wherein in a case where the plurality of DRX groups further include a second DRX group with a second cell configured with CSI reporting resources, CSI for one or more cells in the first DRX group is reported over the CSI reporting resources on the first cell when at least one DRX group includes the first DRX group, and the at least one memory and the computer program code being configured to, with the at least one processor, cause the apparatus to further perform:
reporting CSI for one or more cells in the second DRX group over the CSI reporting resources on the second cell when the at least one DRX group includes the second DRX group.

12. The apparatus of claim 9, wherein the DRX on duration timer of the first DRX group is longer than a DRX on duration timer of a second DRX group.

13. An apparatus comprising:
at least one processor; and
at least one memory comprising computer program code, the at least one memory and the computer program code being configured to, with the at least one processor, cause the apparatus to perform:
transmitting, to a user equipment, a discontinuous reception (DRX) configuration information for configuring a plurality of DRX groups including a first DRX group with a first cell configured with channel state information (CSI) reporting resources; and
receiving CSI for one or more cells in the first DRX group over the CSI reporting resources on the first cell based on the DRX configuration information, when a CSI mask is configured, the first DRX group is in active time, and a DRX on duration timer is running;
wherein, in a case the CSI mask is configured and the DRX on duration timer is not running, the CSI for one or more cells in the first DRX group is not reported via the configured CSI reporting resources on the first cell, and
wherein the first DRX group is a group of cells having a same active time.

14. The apparatus of claim 13, wherein the active time of the first DRX group includes the active time of at least one DRX group.

15. The apparatus of claim 13, wherein in a case where the plurality of DRX groups further include a second DRX group with a second cell configured with CSI reporting resources, CSI for one or more cells in the first DRX group is received over the CSI reporting resources on the first cell when at least one DRX group includes the first DRX group, and the at least one memory and the computer program code being configured to, with the at least one processor, cause the apparatus to further perform:
receiving CSI for one or more cells in the second DRX group over the CSI reporting resources when the at least one DRX group includes the second DRX group.

16. The apparatus of claim 13, wherein the DRX on duration timer of the first DRX group is longer than a DRX on duration timer of a second DRX group.

17. A non-transitory computer readable medium comprising program instructions for causing an apparatus to perform:
receiving, from a base station, a discontinuous reception (DRX) configuration information for configuring a plurality of DRX groups including a first DRX group with a first cell configured with channel state information (CSI) reporting resources;
determining whether the first DRX group of the plurality of DRX groups is in active time; and
determining whether a DRX on duration timer for the first DRX group is running of not,
wherein the first DRX group is a group of cells having a same active time,
wherein, in a case a CSI mask is configured, the first DRX group is in the active time, and the DRX on duration timer is running, CSI for one or more cells in the first DRX group is reported via the configured CSI reporting resources on the first cell, and
wherein, in a case the CSI mask is configured, the first DRX group is in the active time, and the DRX on duration timer is not running, the CSI for one or more cells in the first DRX group is not reported via the configured CSI reporting resources on the first cell.

18. The non-transitory computer readable medium of claim 17, wherein the DRX on duration timer of the first DRX group is longer than a DRX on duration timer of a second DRX group.

19. A non-transitory computer readable medium comprising program instructions for causing an apparatus to perform:
transmitting, to a user equipment, a discontinuous reception (DRX) configuration information for configuring a plurality of discontinuous reception (DRX) groups including a first DRX group with a first cell configured with channel state information (CSI) reporting resources; and
receiving CSI for one or more cells in the first DRX group over the CSI reporting resources on the first cell based on the DRX configuration information, when a CSI mask is configured, the first DRX group is in active time, and a DRX on duration timer is running, wherein, in a case the CSI mask is configured and the DRX on duration timer is not running, the CSI for one or more cells in the first DRX group is not reported via the configured CSI reporting resources on the first cell, and wherein the first DRX group is a group of cells having a same active time.

20. The non-transitory computer readable medium of claim 19, wherein the DRX on duration timer of the first DRX group is longer than a DRX on duration timer of a second DRX group.

* * * * *